United States Patent Office 3,110,648
Patented Nov. 12, 1963

3,110,648
CHLORINATED 4,5,6,7,8,8-HEXACHLORO-4,7-METHYLENE-3a,4,7,7a-TETRAHYDROINDANE
Hans Feichtinger, Duisburg - Beeck, Hans Tummes, Duisburg-Meiderich, and Siegfried Puschhof, Duisburg-Beeck, Germany, assignors to Ruhrchemie Aktiengesellschaft, a German corporation
No Drawing. Filed Sept. 28, 1954, Ser. No. 458,991
Claims priority, application Germany Oct. 2, 1953
8 Claims. (Cl. 167—30)

This invention relates to and has as its object novel, highly effective insecticides.

The novel insecticides in accordance with the invention comprise products which result from the chlorination of addition products which form from hexachlorocyclopentadiene and cyclopentene.

The starting addition compound formed from hexachlorocyclopentadiene has the composition $C_{10}H_8Cl_6$ and the structural formula:

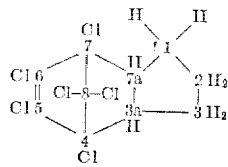

This addition compound which constitutes the starting material in accordance with the invention and constitutes a valuable product exhibiting certain insecticidal properties in itself and serving as an intermediate product for the production of the highly effective insecticides in accordance with the invention.

The novel, highly effective insecticides for combating insect pests in accordance with the invention are produced by chlorinating the above mentioned starting product. These higher chlorinated compounds may be used alone or in admixture with other known chlorinated insecticides.

In accordance with "The Ring Index" by Patterson and Capell, A.C.S. Monograph Series No. 84 (1940), dicyclopentadiene ($C_{10}H_{12}$) is designated as 4,7-methano-3a,4,7,7a-tetrahydroindene. Using the same nomenclature system, the above mentioned starting material for producing the insecticides in accordance with the invention may be designated as 4,5,6,7,8,8-hexachloro-4,7-methylene-3a,4,7,7a-tetrahydroindane. The formation of this compound from hexachlorocyclopentadiene and cyclopentene as mentioned above proceeds in accordance with the well known Diels-Alder reaction with the cyclopentene reacting as a dienophile component. The reaction proceeds in accordance with the following reaction equation:

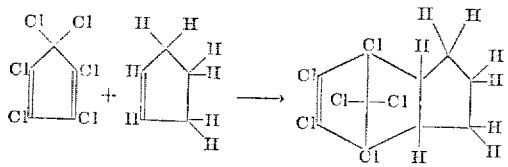

Although it was known that cyclopentadiene is a strong dienophile component for the Diels-Alder reaction and, for example, with hexachlorocyclopentadiene will form an addition compound in an exothermic reaction, it was never expected that the cyclopentene having a single double bond would be suited for the Diels-Alder reaction and would be able to react as a dienophile component in the diene synthesis. In accordance with the invention, it has surprisingly been found that cyclopentene will react as an excellent dienophile component in the Diels-Alder reaction, forming an addition compound with hexachlorocyclopentadiene in a smooth reaction at elevated temperature in accordance with the above equation.

This reaction is very simply effected by heating the hexachlorocyclopentadiene and cyclopentene at a temperature ranging between 100 and 200° C. and preferably at temperatures between about 100 and 140° C. At about 100° C. more than 24 hours are required for the complete conversion while the reaction may be completed within about 4 hours when operating at 140° C.

The following tables set forth the yields of 4,5,6,7,8,8-hexachloro-4,7-methylene-3a,4,7,7a-tetrahydroindane as a function of the reaction temperature and the reaction time:

[Reaction temperature: 140° C.]

| Reaction time, hours | Yield, percent of the theoretically possible quantity |
| --- | --- |
| 1 |  |
| 2 | 86 |
| 4 | 93 |
|  | 93 |

[Reaction temperature: 120° C.]

| Reaction time, hours | Yield, percent of the theoretically possible quantity |
| --- | --- |
| 1 |  |
| 2 | 43 |
| 4 | 57 |
| 8 | 73 |
| 24 | 90 |
|  | 96 |

[Reaction temperature: 100° C.]

| Reaction time, hours | Yield, percent of the theoretically possible quantity |
| --- | --- |
| 8 | 48 |
| 16 | 71 |
| 24 | 81 |

Heating of the reactants is preferably effected in a closed pressure reaction vessel. Suitable reaction vessels when operating with smaller quantities of the reactants constitute thick-walled pressure-resistant glass containers, while pressure vessels of stainless steel or enamelled pressure vessels are suitable for use with larger amounts of the reactants. The pressure which develops during the reaction is dependent upon the reaction temperature and the molar ratio of the starting materials. The pressure itself, however, is not important and will result from the vapor pressure of the readily volatile cyclopentene. Thus, for example, with a reaction mixture comprising 1 mol hexachlorocyclopentadiene and 1 mol cyclopentene the reaction pressure at 170° C. is about 7 kg./square centimeter. A mixture of 1 mol hexachlorocyclopentadiene and 2 mols cyclopentene at 170° C. produces a reaction pressure of 18 kg./square centimeter. The reaction will proceed with almost any molar ratio of the two reactants. If the heating is continued for a correspondingly long time, the reactant which is not present in excess will always be completely consumed, while the excess portion of the other reactant will remain in the reaction mixture and may be recovered in the processing. It is preferable to use an excess of the more volatile cyclopentene which is more easily separated in order that the more difficultly separable hexachlorocyclopentadiene is converted as completely as possible. It has been found particularly advantageous to use a reaction mixture containing 1 mol of hexachlorocyclopentadiene to 1.5 mols cyclopentene. The reaction may be effected in the presence of inert solvents or diluents as, for example, benzene, toluene or aliphatic hydrocarbons boiling between 100 and 150° C. This, however, produces no substantial advantages.

The Diels-Alder addition compound in accordance with the invention may be separated from the reaction mixture by distilling off the reactant which is present in excess, and preferably the cyclopentene, under a reduced pressure. This results in a solidification of the reaction mixture to form a crystalline mass. The raw addition product obtained in this manner may be purified by recrystallization from organic solvents with the use of activated carbon. Lower alcohols such as methanol, ethanol and isopropanol are particularly well suited for this purification. In these solvents the novel starting compound in accordance with the invention is relatively easily soluble while hot but relatively insoluble while cold. The addition compound may also be separated from the reaction mixture by a fractional vacuum distillation. In this distillation, the unconverted starting materials distill off at the first running at a low temperature so that they may easily be separated from the relatively high boiling reaction product.

The addition compound, after purification by recrystallization, constitutes an odorless, colorless crystalline mass having a melting point of 212° C. (corr.).

This addition compound in accordance with the invention, as contrasted to the known 4,5,6,7,8,8-hexachloro-4,7-methylene-3a,4,7,7a-tetrahydroindene, has a saturated bond between the 2 and 3 position in the 5-membered ring and 2 hydrogen atoms in each of the 2 and 3 position. As contrasted to this, the known addition compound prepared from hexachlorocylopentadiene and cyclopentadiene has an unsaturated bond between the 2 and 3 position.

It is known that the chlorination of the Diels-Alder addition compound obtained from hexachlorocyclopentadiene and cyclopentadiene yields an octachloro addition product (chlordane) or a heptachloro substitution product (heptachlor) with high insecticidal efficiencies (see, for example, U.S. Patent No. 2,519,190 and British Patent No. 618,432).

It has now been found that, by chlorinating the Diels-Alder addition compound of hexachlorocyclopentadiene and cyclopentene, products are obtained, the insecticidal efficiencies of which are superior to those of the above mentioned and already known chlordane or heptachlor. The compounds prepared in accordance with the invention must, therefore, possess a novel arrangement of the chlorine atoms within the 4,7-methylene-3a,4,7,7a-tetrahydroindane skeleton.

Since the starting material of the process of the invention has no double bond in the non-substituted 5-membered ring, the chlorination proceeds in a manner different from that in connection with the unsaturated compound. The clorination of the addition compound of hexachlorocyclopentadiene and cyclopentadiene to form the "chlordane" involves the addition of the chlorine to the double bond and the chlorination to form the "heptachlor" involves a monosubstitution of chlorine in allyl position with the preservation of the double bond, which monosubstitution proceeds only in the presence of peroxides. In contrast to this, the chlorination of 4,5,6,7,8-hexachloro-4-7-methylene-3a,4,7,7,7a-tetrahydroindane is a pure substitution reaction of the saturated 5-membered ring. The entrance of the chlorine into the 5-membered ring is not influenced by a directing group (double bond) of this ring, but only by the anellated hexachlorobicycloheptene ring.

The possibility for the entrance of further chlorine atoms into the 4,5,6,7,8-hexachloro-4,7-methylene-3a,4,7,7a-tetrahydroindane only exists where the ring is substituted with hydrogen, i.e. in the 1, 2, 3, 3a and 7a position. A substitution at the tertiary carbon atoms in the 3a and 7a position is very unlikely because of the steric hindrance by the chlorinated bicycloheptene ring so that the chlorine substitution probably involves only the three secondary carbon atoms in the 1, 2, and 3 position. Detailed statements about the exact position of the additionally entering chlorine atoms cannot be made but it can be assumed with a great probability that the entering chlorine atoms distribute over the carbon atoms in the 1, 2 and 3 position in a statistic equilibrium which is dependent upon the particular degree of chlorination.

The chlorination, in accordance with the invention, of 4,5,6,7,8,8 - hexachloro-4,7-methylene-3a,7,7a-tetrahydroindane results in a particular reproducible mixture of chlorinated compounds of 4,7-methylene-tetrahydroindane depending upon the degree of chlorination which constitute novel, highly effective insecticides in accordance with the invention.

The chlorination of 4,5,6,7,8,8-hexachloro-4,7-methylene-3a,4,7,7a-tetrahydroindane may be effected by conventional methods known for the chlorination of hydrocarbons. Most preferably, the chlorine is allowed to act upon the Diels-Alder addition product which is present in a solution while irradiating with actinic light. Suitable sources of light include all ultraviolet light radiators such as mercury vapor lamps, ordinary electric bulbs and illuminating tubes. The use of sunlight and bright daylight is also possible.

All organic solvents in which the starting material can be dissolved or dispersed and which are resistant to chlorine under the reaction conditions may be used in the chlorination. Particularly well suited solvents are chlorohydrocarbons such as carbon tetrachloride, chloroform or trichlorethylene. The reaction temperature may range between 0° and 70° C. The chlorine is expediently passed in the gaseous state into the stirred solution of the Diels-Alder addition product while irradiating with actinic light. The chlorination time is dependent upon the operating temperature, the light source and the degree of chlorination desired.

The chlorination of the Diels-Alder addition product may also be effected with other chlorinating agents such as sulfurylchloride in the presence of catalysts which accelerate the substitution of the chlorine, such as with the use of peroxides. The chlorination products are separated from the reaction mixture by removing the solvent by distillation and by separating the catalysts, if added, by filtration. The residue remaining after the removal of all volatile materials constitutes the chlorination mixture in accordance with the invention.

Depending upon the chlorine content, these mixtures are viscous, colorless or slightly yellowish colored oils which, at room temperature, solidify partially or completely to form a crystalline mass and are easily soluble in almost all organic solvents such as aliphatic hydrocarbons, ether, benzene, toluene, dioxane, chloroform, carbon tetrachloride, trichlorethylene and acetone. The chlorination mixture is only sparingly soluble in cold alcohols, but easily soluble in warm alcohols. It is insoluble in cold and hot water. Under high vacuum, the chlorination mixtures may be distilled without decomposition and a certain separation into individual fractions of different chlorine contents is possible. Separation of the chlorination mixtures obtained in accordance with the invention into individual fractions is also possible by distribution between two solvents or by chromatographic adsorption. The chlorination mixtures are highly resistant to hydrolyzing influences.

EXAMPLE 1

273 gms. of hexachlorocyclopentadiene and 100 gms. cyclopentene were heated for 16 hours at 120° C. in a thick-walled glass container. Following this, the excess cyclopentene was distilled off from the reaction mixture on a water bath at 20 mm. Hg. Thereby, the reaction mixture solidified to form a darkly colored crystal mass which was dissolved hot in 500 cc. of isopropyl alcohol. The solution was decolorized with activated carbon and filtered hot. On cooling to −20° C., 290 gms. of the Diels-Alder addition compound crystallized from the solution forming colorless crystals. By concentrating the mother liquor, another 34 gms. of the addition compound could be obtained, thus making the yield a total of 324 gms. of 4,5,6,7,8,8-hexachloro-4,7-methylene-3a,4,7,7a-tetrahydroindane.

Above 150° C., the product was highly apt to sublimate. The melting point of the purified product was 212° C. When stored, the product which was at first crystalline assumed a lumpy structure by sticking together of the crystals.

[Analysis: $C_{10}H_8Cl_6$. Molecular weight: 340.90]

|   | Calculated, percent | Found, percent |
|---|---|---|
| C | 35.23 | 34.82 |
| H | 2.36 | 2.42 |
| Cl | 62.41 | 62.66 |

The 4,5,6,7,8,8-hexachloro-4,7-methylene-3a,4,7,7a-tetrahydroindane produced in the manner described above was of insecticidal efficiency. With a covering density of 0.137 mg. of this compound per square centimeter of the test tube, 40% of 30 flies (*Musca domestica* having an age of 4 days) were irreversibly damaged as determined by a modified method described by W. M. Hoskins and P. S. Messenger (Agricultural Control Chemicals, Advances in Chemistry, Series 1, pages 93–98 (1950)).

EXAMPLE 2

273 gms. hexachlorocyclopentadiene and 100 gms. cyclopentene were heated for 5 hours at 140° C. in a tube of stainless steel ($V_4A$). The reaction mixture obtained was subsequently processed in the manner described in Example 1. This resulted in 315 gms. 4,5,6,7,8,8-hexachloro-4,7-methylene-3a,4,7,7a-tetrahydroindane in the pure form.

EXAMPLE 3

273 gms. hexachlorocyclopentadiene and 100 gms. cyclopentene were heated for 24 hours at 100° C. in a thick-walled glass tube. The reaction mixture obtained was at first freed from unconverted cyclopentene at 20 mm. Hg and 60° C. and then 80 gms. of unconverted hexachlorocyclopentadiene was distilled off under vacuum of 1 mm. Hg at 100° C. By recrystallization of the distillation residue thereby obtained, 235 gms. pure 4,5,6,7,8,8-hexachloro-4,7-methylene-3a,4,7,7a-tetrahydroindane were obtained.

EXAMPLE 4

20 gms. 4,5,6,7,8,8-hexachloro-4,7-methylene-3a,4,7,7a-tetrahydroindane were dissolved in 100 cc. carbon tetrachloride. The solution, while being irradiated with ultraviolet light, was treated for 20 minutes at 30° C. with gaseous chlorine which was passed over at a rate of 5 liters per hour. During the reaction, the material was thoroughly mixed by means of a gas-tight stirrer. After evaporation of the solvent, there remained 22 gms. of a white crystalline product which contained 65.74% of chlorine and had the empirical molecular formula $$C_{10}H_{7.1}Cl_{6.9}$$

This product was designated as "chlorination mixture A."

EXAMPLE 5

20 gms. 4,5,6,7,8,8-hexachloro-4,7-methylene-3a,4,7,7a-tetrahydroindane, in the manner described in Example 4, were dissolved in 100 cc. of chloroform and chlorinated for 40 minutes at 50° C. After the removal of the solvent, 24 gms. of a viscous bright chlorination product were obtained. The chlorine content was 68.66% which corresponded to the empirical molecular formula $$C_{10}H_{6.2}Cl_{7.8}$$

This product was designated as "chlorination mixture B."

EXAMPLE 6

20 gms. of the Diels-Alder addition product from hexachlorocyclopentadiene and cyclopentene, in the manner described in Example 4, were dissolved in 100 cc. of carbon tetrachloride and chlorinated for 60 minutes at 30° C. The oily water-white residue in amount of 25.5 gms. remaining after evaporation of the solvent had a chlorine content of 70.91% corresponding to the empirical molecular formula $C_{10}H_{5.4}Cl_{8.6}$. This product was designated as "chlorination mixture C."

EXAMPLE 7

20 gms. of the Diels-Alder addition product mentioned in Example 4 were dissolved in 100 cc. of trichloroethylene and chlorinated for 2 hours at 60° C. in the manner described in Example 4. After the removal of the solvent under vacuum, there were obtained 28 gms. of a viscous oil which partially solidified in the form of crystals and had a chlorine content of 73.62% corresponding to the empirical molecular formula $C_{10}H_{4.3}Cl_{9.7}$. This product was designated as "chlorination mixture D."

EXAMPLE 8

As described in Example 4, 34.1 gms. of the Diels-Alder addition product were dissolved in 50 cc. carbon tetrachloride and heated for 8 hours with 27 gms. sulfuryl chloride and with the addition of 0.2 gm. benzoyl peroxide under a reflux condenser. After the termination of the reaction, the solution was evaporated to dryness under vacuum. The residue was dissolved in 50 cc. of petroleum ether, washed two times with sodium bicarbonate, dried with sodium sulfate, and again evaporated under vacuum. This resulted in 39 gms. of a yellowish-brown oil having the empirical molecular formula $C_{10}H_{6.2}Cl_{7.8}$ and a refractive index, $n_D^{20}$, of 1.5772. This product was designated as "chlorination mixture E."

The particular characteristic of the chlorination mixtures in accordance with the invention is their high insecticidal efficiency when having specific chlorine contents. Approximately 1–3 additional Cl atoms may be added to the starting 4,5,6,7,8,8-hexachloro-4,7-methylene-3a,4,7,7a-tetrahydroindane to produce the new insecticides in accordance with the invention. High insecticidal efficiency is obtained if the chlorinated product contains about 67–70% by weight Cl and preferably about 68.5% Cl. As shown in the following Table I, the insecticidal efficiency increases as the chlorine content increases and reaches a maximum with a content of about 7.8 gram atoms of chlorine per mol (68.5% by weight of chlorine). With still higher chlorine contents, the efficiency decreases. The figures of Table I show the $LD_{50}$ values (50% mortality) for *Musca domestica* as a function of the chlorine content of the chlorination mixtures, which values were determined by the method of W. M. Hoskins and P. S. Messenger (Agricultural Control Chemicals, Advances in Chemistry, Series 1 (1950), pages 93–98).

*Table I*

| Cl atoms per molecule | Chlorine content, percent by weight | Example | Product | Relative toxicity $LD_{50}$ BHC=40 |
|---|---|---|---|---|
| 6.9 | 65.7 | 4 | A | 6.3 |
| 7.3 | 67.0 |  |  | 22 |
| 7.75 | 68.5 | 5 | B | 44 |
| 8.1 | 69.5 |  |  | 33.5 |
| 8.6 | 70.8 | 6 | C | 5.6 |
| 9.0 | 71.8 |  |  | 1.35 |
| 9.5 | 73.0 | 7 | D | 0.2 |

In Table I, the toxicity ($LD_{50}$) of γ-hexachloro-cyclohexane which, in the American literature, is designated as "BHC" or is also known under the name of "lindane" has been assumed to be 40.

The high insecticidal efficiency of the chlorination mixtures according to the invention when applied to *Musca*

*domestica* (house fly) as compared with the known insecticides, BHC, DDT (dichloro-diphenyl-trichlorethane), toxaphene (chlorinated camphene), chlordane and aldrine, may be seen from the following Table II. This table gives the relative toxicities ($LD_{50}$ for *Musca domestica*) if the efficiency of BHC is assumed to be 40.

Table II

| Active material | Relative toxicity $LD_{50}$ BHC=40 |
| --- | --- |
| BHC | 40 |
| DDT | 6 |
| Toxaphene | 2 |
| Chlordane | 9 |
| Aldrin | 33–40 |
| Chlorination mixture B (Example 5) | 44 |

The insecticidal efficiency of the chlorination mixture B (Example 5) when applied to various insects is likewise very high as may be seen from the following Tables III to V.

The values shown in these tables were obtained in the following manner: A solution of the chlorination mixture B in acetone was uniformly dropped on circular pieces of filter paper. The concentration of the solution was 1%, 0.5% and 0.1% by weight, respectively, of the chlorination mixture B. About 0.0045 ml. of solution containing the active material were applied per square centimeter of filter paper. The thus treated filter papers were then placed after 2, 7, 12 and 16 days, respectively, into round dishes provided with low rims (Petri dishes) so as to cover the bottom of said dishes. The dishes thus prepared were occupied with experimental animals. The following efficiencies were observed depending upon the concentrations of active material:

Table III

[Concentration of active material: 1 gm./100 ml. acetone]

| Noxious Insects | Age of coverings, days | Residence time, days | Irreversible damage, percent |
| --- | --- | --- | --- |
| Grain weevil (*Calandra granaria*) | 16 | 1 | 100 |
| Rice flour weevil (*Tribolium confusum*) | 16 | 1 | 100 |
| Rice weevil (*Calandra oryzae*) | 16 | 1 | 100 |
| House fly (*Musca domestica*) (DDT "Resistance culture") | 12 | 1 | 100 |
| Bedbugs (*Cimex lectularius*) | 2 | 1 | 100 |
| Oriental moth (*Blatta orientalis*) | 2 | 3 | 100 |
|  | 7 | 5 | 100 |

Table IV

[Concentration of active material: 0.5 gm./100 ml. acetone]

| Noxious Insects | Age of coverings, days | Residence time, days | Irreversible damage, percent |
| --- | --- | --- | --- |
| Rice flour weevil (*Tribolium confusum*) | 16 | 1 | 100 |
| House fly (*Musca domestica*) (DDT "Resistance culture") | 12 | 2 | 100 |
| Bedbugs (*Cimex lectularius*) | 2 | 2 | 100 |
|  | 2 | 4 | 80 |
| Oriental moth (*Blatta orientalis*) | 7 | 5 | 100 |

Table V

[Concentration of active material: 0.1 gm./100 ml. acetone]

| Noxious Insects | Age of coverings, days | Residence time, days | Irreversible damage, percent |
| --- | --- | --- | --- |
| Grain weevil (*Calandra granaria*) | 2 | 3 | 100 |
| Rice flour weevil (*Tribolium confusum*) | 16 | 2 | 70 |
| Bedbugs (*Cimex lectularius*) | 2 | 4 | 100 |
| Oriental moth (*Blatta orientalis*) | 7 | 10 | 60 |

As compared with DDT, the chlorination mixture B, according to the invention, has a considerably higher toxicity. With regard to the duration of the toxicity, this product is equal to DDT. The long duration of toxicity obtainable in accordance with the invention is demonstrated by the fact that the toxicity of the chlorination mixture B to *Musca domestica* and *Calandra granaria* after, for example, 16 days was not substantially lower than at the first day.

In addition to the high toxicity and long lasting efficiency, the chlorination products according to the invention have a high stability towards alkaline materials which gives them extremely extensive possibilities as to their application.

The relatively high stability of the chlorination mixtures of the invention towards alkaline materials is of great advantage in the application of these insecticides in combination with lime and alkaline acting artificial fertilizers, and in this connection the products of the invention are considerably better than, for example, γ-hexachlorocyclo-hexane (BHC), dichlorodiphenyl-trichlorethane (DDT) or chlordane which decompose very quickly in the presence of alkaline materials.

The chlorination products obtained in accordance with the invention are effective against various kinds of insect pests and organisms and may be used as insecticides in any manner known per se. These materials may be mixed with oils usual for insecticides and the solutions or emulsions thereby obtained may be sprayed or applied in another manner. The chlorination products produced according to the invention may also be combined with finely divided or pulverized carrier materials to obtain wettable or non-wettable insecticidal dusting agents. The new chlorination products may also be used in combination with emulsifiers such as water or with water and oils to produce insecticidal emulsions. They may also be incorporated into aerosols.

The chlorination mixtures obtained in accordance with the invention may also be used in mixture with other already known insecticides. This results in surprising effects.

The chlorination mixtures produced in accordance with the invention possess no high initial toxicity but are slowly acting insecticides. When combining these new insecticides with an insecticide which has a high initial toxicity as, for example, with γ-hexachloro-cyclohexane (BHC), then novel compositions are obtained which exhibit the high initial toxicity of the other insecticide, as, for example, of BHC although the latter is only partly contained in the mixture. Compositions of this kind possess, for example, the relative toxicities shown in the following Table VI, the values of which have been obtained in the usual manner in combating *Musca domestica*.

Table VI

| Insecticide | Relative toxicity after 2 hours |
| --- | --- |
| BHC | 40 |
| Chlorination mixture B | 7 |
| 80% BHC +20% chlorination mixture B | 40 |
| 50% BHC +50% chlorination mixture B | 44 |
| 20% BHC +80% chlorination mixture B | 18 |

Table VI indicates that BHC has a relative toxicity of 40 and that the chlorination product B (see Example 5) has only a toxicity of 7. If 80% of BHC are combined with 20% of chlorination mixture B, then the same toxicity of the pure BHC is obtained. When mixing equal parts by weight of BHC and chlorination mixture B, even a higher toxicity than that of pure BHC can be observed.

We claim:

1. The chlorinated Diels-Alder adduct 4,5,6,7,8,8-hexachloro-4,7-methylene-3a,4,7,7a-tetrahydroindane of hexachlorocyclopentadiene and cyclopentene having 1-3 additional chlorine atoms directly substituted for hydrogen and containing about 67 to 70% by weight of chlorine.

2. Chlorinated adduct according to claim 1 having about two additional chlorine atoms directly substituted for hydrogen.

3. The chlorinated adduct according to claim 1, containing about 68.5% by weight of chlorine.

4. An insecticide comprising the chlorinated Diels-Alder adduct of hexachlorocyclopentadiene and cyclopentene, having 1-3 additional chlorine atoms directly substituted for hydrogen and containing about 67-70% by weight chlorine.

5. Insecticide according to claim 4, in which said adduct contains about 68.5% by weight of chlorine.

6. Insecticide according to claim 4, additionally containing about equal parts by weight of γ-hexchloro-cyclohexane per part by weight of said chlorinated adduct.

7. An insecticide comprising the chlorinated Diels-Alder adduct of hexachlorocyclopentadiene and cyclopentene containing about two additional atoms of chlorine directly substituted for hydrogen and having a chlorine content of about 68.5% by weight of chlorine.

8. Insecticide according to claim 7, additionally containing about equal parts by weight of γ-hexachloro-cyclohexane per part by weight of said chlorinated adduct.

References Cited in the file of this patent

UNITED STATES PATENTS

| | | |
|---|---|---|
| 2,519,190 | Hyman | Aug. 15, 1950 |
| 2,561,209 | Kittleson et al. | July 17, 1951 |
| 2,676,132 | Bluestone | Apr. 20, 1954 |
| 2,724,730 | Johnson | Nov. 22, 1955 |
| 2,818,445 | Bluestone et al. | Dec. 31, 1957 |
| 3,050,567 | Schmerling | Aug. 21, 1962 |

UNITED STATES PATENT OFFICE

CERTIFICATE OF CORRECTION

Patent No. 3,110,648                                      November 12, 1963

Hans Feichtinger et al.

It is hereby certified that error appears in the above numbered patent requiring correction and that the said Letters Patent should read as corrected below.

Column 3, line 60, for "4-7-methylene-3a,4,7,7,7a-" read -- 4,7-methylene-3a,4,7,7a- --; column 6, line 73, for "assumer" read -- assumed --; column 7, Table II, first column, line 5 thereof, for "Aldrin" read -- Aldrine --.

Signed and sealed this 28th day of April 1964.

(SEAL)
Attest:

ERNEST W. SWIDER                                    EDWARD J. BRENNER

Attesting Officer                                         Commissioner of Patents